(12) United States Patent
Kita et al.

(10) Patent No.: US 10,792,653 B2
(45) Date of Patent: Oct. 6, 2020

(54) EMISSIONS CONTROL SUBSTRATE

(71) Applicant: DENSO International America, Inc., Southfield, MI (US)

(72) Inventors: Masayuki Kita, Kariya (JP); Nicholas Polcyn, Commerce, MI (US); Han-Yuan Chang, Ann Arbor, MI (US)

(73) Assignee: DENSO International America, Inc., Southfield, MI (US)

( * ) Notice: Subject to any disclaimer, the term of this patent is extended or adjusted under 35 U.S.C. 154(b) by 433 days.

(21) Appl. No.: 15/889,280

(22) Filed: Feb. 6, 2018

(65) Prior Publication Data
US 2019/0240651 A1 Aug. 8, 2019

(51) Int. Cl.
| | | |
|---|---|---|
| *B01J 23/10* | (2006.01) | |
| *B01J 23/32* | (2006.01) | |
| *B01J 23/40* | (2006.01) | |
| *B01J 23/42* | (2006.01) | |
| *B01J 23/44* | (2006.01) | |
| *B01J 23/46* | (2006.01) | |

(Continued)

(52) U.S. Cl.
CPC .......... *B01J 35/04* (2013.01); *B01D 46/0061* (2013.01); *B01D 46/247* (2013.01); *B01D 46/2459* (2013.01); *B01D 53/94* (2013.01); *B01J 23/745* (2013.01); *F01N 3/0222* (2013.01); *F01N 3/2828* (2013.01); *B01D 2046/2488* (2013.01); *B01D 2046/2492* (2013.01); *B01D 2279/30* (2013.01)

(58) Field of Classification Search
CPC ... B01J 23/10; B01J 23/32; B01J 23/40; B01J 23/42; B01J 23/44; B01J 23/46; B01J 23/72; B01J 23/745; B01J 23/755; B01J 35/04; B01D 46/0061; B01D 46/2459; B01D 46/247; B01D 53/94; F01N 3/0222; F01N 3/2828

See application file for complete search history.

(56) References Cited

U.S. PATENT DOCUMENTS

| | | | |
|---|---|---|---|
| 5,714,228 A | * 2/1998 | Beckmeyer | .......... B01D 53/885 422/177 |
| 7,238,217 B2 | 7/2007 | Cutler et al. | |

(Continued)

FOREIGN PATENT DOCUMENTS

| | | |
|---|---|---|
| JP | 2007222865 A | 9/2007 |
| JP | 201053697 A | 3/2010 |

*Primary Examiner* — Cam N. Nguyen
(74) *Attorney, Agent, or Firm* — Harness, Dickey & Pierce, P.L.C.

(57) ABSTRACT

An emissions control substrate for treating exhaust from an engine including a plurality of hexagonal cells extending between a first end and a second end of the substrate. Wash coats are at an interior of the hexagonal cells. At an inner region of the substrate through which a longitudinal axis of the emissions control substrate extends, for every group of three adjacent hexagonal cells of the plurality of hexagonal cells two are plugged at the first end and open at the second end, and one is open at the first end and plugged at the second end. At an outer region of the substrate surrounding the inner region, for every group of three adjacent hexagonal cells of the plurality of hexagonal cells, one is plugged at the first end and open at the second end, and two are open at the first end and plugged at the second end.

20 Claims, 3 Drawing Sheets

(51) Int. Cl.

| | | |
|---|---|---|
| *B01J 23/72* | (2006.01) | |
| *B01J 23/745* | (2006.01) | |
| *B01J 23/755* | (2006.01) | |
| *B01J 35/04* | (2006.01) | |
| *B01D 46/00* | (2006.01) | |
| *B01D 46/24* | (2006.01) | |
| *B01D 53/94* | (2006.01) | |
| *F01N 3/022* | (2006.01) | |
| *F01N 3/28* | (2006.01) | |

(56) References Cited

U.S. PATENT DOCUMENTS

| | | | | |
|---|---|---|---|---|
| 7,575,793 | B2* | 8/2009 | Aniolek | B01D 46/0063 |
| | | | | 428/116 |
| 7,833,495 | B2* | 11/2010 | Willey | F01N 3/0222 |
| | | | | 422/180 |
| 8,470,254 | B2* | 6/2013 | Mizutani | B01J 35/04 |
| | | | | 422/177 |
| 8,470,255 | B2* | 6/2013 | Mizutani | B01J 23/002 |
| | | | | 422/177 |
| 9,073,289 | B2 | 7/2015 | Tamai et al. | |
| 9,352,310 | B2 | 5/2016 | Aoki et al. | |
| 9,694,322 | B2* | 7/2017 | Teysset | B01J 23/42 |
| 2002/0076523 | A1 | 6/2002 | Ketcham et al. | |
| 2008/0110341 | A1 | 5/2008 | Ketcham et al. | |

* cited by examiner

EMISSIONS CONTROL SUBSTRATE

FIELD

The present disclosure relates to an emissions control substrate for an engine exhaust system to treat exhaust before it is released into the atmosphere.

BACKGROUND

This section provides background information related to the present disclosure, which is not necessarily prior art.

Emissions control substrates are often used with engine exhaust systems to treat exhaust before it is released into the atmosphere. For example, a catalytic converter substrate is often used with automobile exhaust systems to catalyze a redox reaction, thereby converting CO into $CO_2$, and converting $NO_x$ into $N_2$ and $O_2$. A particulate filter substrate is often used to treat exhaust gas from an engine by filtering particulate matter out of the exhaust.

While existing emissions control substrates are suitable for their intended use, they are subject to improvement. For example, some emissions control substrates have a wash coat, which includes precious metals to catalyze the redox reaction and facilitate regeneration of the substrate. The wash coat may undesirably increase friction, increase exhaust backpressure, and reduce engine power. Also, the wash coat is often arranged such that exhaust is directed through the thinnest portion of the wash coat, which reduces the effectiveness of the wash coat. The present disclosure provides for emissions control substrates that address these needs in the art, as well as numerous others, and provide various unexpected and advantageous results, as described herein and as one skilled in the art will appreciate.

SUMMARY

This section provides a general summary of the disclosure, and is not a comprehensive disclosure of its full scope or all of its features.

The present disclosure includes an emissions control substrate for treating exhaust from an engine including a plurality of hexagonal cells extending between a first end and a second end of the substrate. Wash coats are at an interior of the hexagonal cells. At an inner region of the substrate through which a longitudinal axis of the emissions control substrate extends, for every group of three adjacent hexagonal cells of the plurality of hexagonal cells two are plugged at the first end and open at the second end, and one is open at the first end and plugged at the second end. At an outer region of the substrate surrounding the inner region, for every group of three adjacent hexagonal cells of the plurality of hexagonal cells, one is plugged at the first end and open at the second end, and two are open at the first end and plugged at the second end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
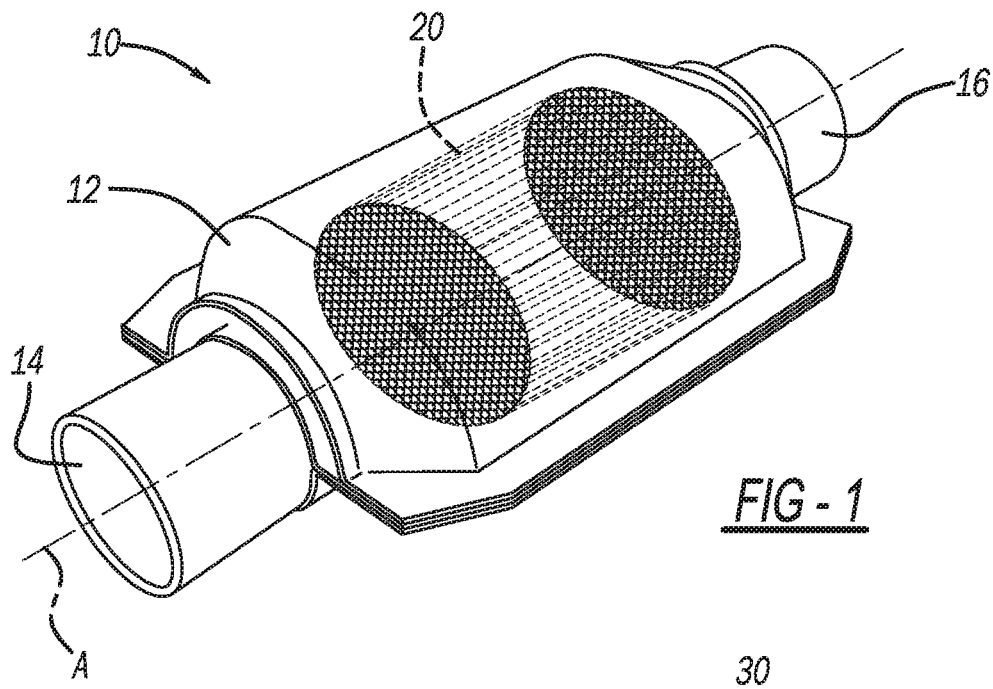
FIG. 1 illustrates portions of an exhaust system including an emissions control substrate in accordance with the present disclosure.

With initial reference to FIG. 1, an emissions control assembly according to the present disclosure is illustrated at reference numeral 10. The emissions control assembly includes an exhaust chamber or shell 12 having an inlet 14 and an outlet 16 on opposite sides thereof. Exhaust enters the chamber 12 through the inlet 14, and exits the chamber 12 through the outlet 16. Within the exhaust chamber 12 is an emissions control substrate 20, which can be configured as a catalytic converter and/or a particulate filter depending on the application. The emissions control device 10 is configured to be coupled to an exhaust system of an engine, such as any suitable internal combustion engine, including a vehicle engine, generator engine, etc. With respect to vehicles, the emissions control device 10 can be used with any suitable vehicle including passenger vehicles, sport utility vehicles, recreational vehicles, military vehicles, mass transit vehicles, locomotives, watercraft, aircraft, etc.

The emissions control device 10, and particularly the substrate 20 thereof, can be formed in any suitable manner, such as with any suitable three-dimensional manufacturing or printing process (also known as additive manufacturing) using any suitable three-dimensional manufacturing device. Any suitable type of three-dimensional manufacturing can be used, such as, but not limited to, the following, which are generally referred to herein as three-dimensional printing: fused deposition modeling; fused filament fabrication; robocasting; stereo lithography; digital light processing; powder bed three-dimensional printing; inkjet head three-dimensional printing; electron-beam melting; selective laser melting; selective heat sintering; selective laser sintering; direct metal laser sintering; laminated object manufacturing; and electron beam freeform fabrication. The substrate 20 can be manufactured apart from, or together with, the exhaust chamber 12. When manufactured together, three-dimensional printing can be used to manufacture the entire emissions control device 10 with the substrate 20 within the chamber 12, thereby simplifying manufacturing, assembly, and installation of the emissions control device 10, and typically reducing the overall cost of the emissions control device 10.

Figure 2:
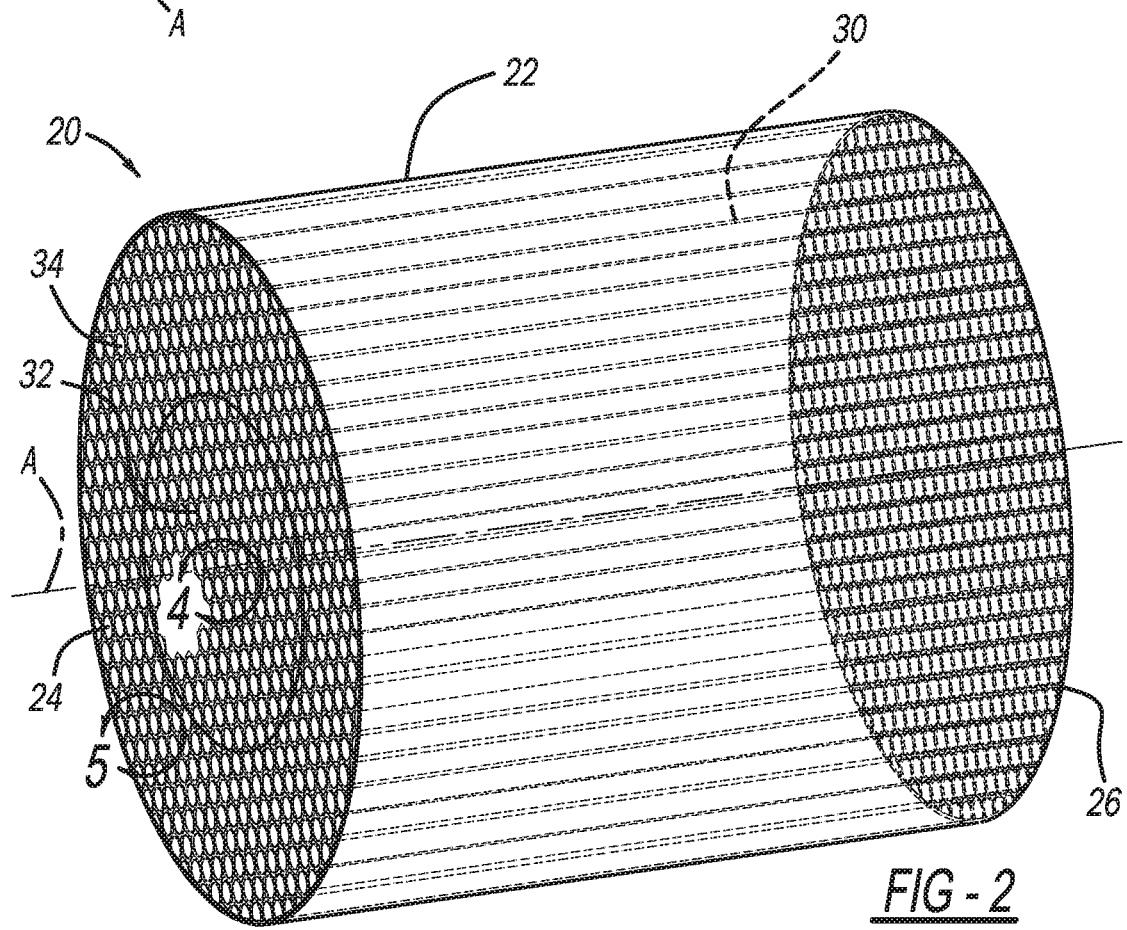
FIG. 2 is a perspective view of the emissions control substrate of FIG. 1.

With additional reference to FIG. 2, the emissions control substrate 20 will be described in further detail. The substrate 20 includes a body 22, which can be made of any suitable material, such as any suitable porous material. Any suitable ceramic porous material may be used, such as cordierite. The body 22 includes a first end (inlet end) 24 and a second end (outlet end) 26. Extending between the first end 24 and the second end 26 are a plurality of exhaust channels 30. In the example illustrated, the channels 30 extend parallel to a longitudinal axis A of the body 22. The channels 30 need not extend parallel to the longitudinal axis A, however, and thus may extend in any manner that is not parallel to the longitudinal axis A (e.g., a helical or wave-like manner, for example).

The body 22 generally includes two groups of channels 30. A first group of channels 30 are arranged at an inner region 32 of the body 22, and a second group of channels 30 are arranged at an outer region 34 of the body 22. The inner region 32 is at, and surrounds, a radial center of the body 22 through which the longitudinal axis A extends. The outer region 34 surrounds the inner region 32. As described in detail herein, the channels 30 are arranged and configured to spread exhaust flow outward from the longitudinal axis A and the inner region 32 so that exhaust flow is less concentrated at the inner region 32, and is more evenly distributed through the body 22 and specifically the channels 30 thereof.

Figure 3:
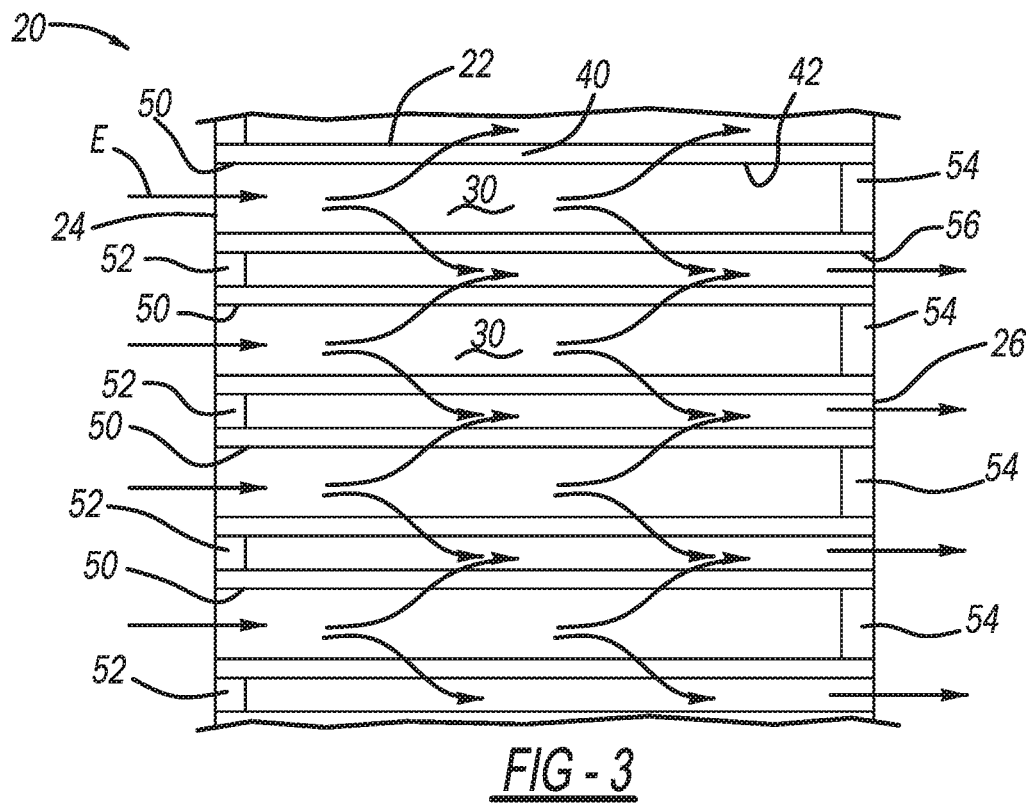
FIG. 3 is an exemplary cross-sectional view of the emissions control substrate of FIG. 1.

With additional reference to FIGS. 3-5, the channels 30 will now be described in additional detail. The channels 30 are defined by sidewalls 40 of the body 22. The sidewalls 40 are arranged in a hexagonal pattern to define a plurality of hexagonal cells 42, which are coated with a wash coat 44 (see FIGS. 4 and 5). The wash coat 44 can be applied to the sidewall 40 in any suitable manner. In the example illustrated, the wash coat 44 is applied to provide the channels 30 with a circular shape and cross-section, notwithstanding the hexagonal arrangement of the sidewalls 40.

When the emissions control substrate 20 is configured as a catalytic converter, the wash coat 44 may include any suitable metallic catalyst configured to catalyze conversion of carbon monoxide, hydrocarbons, and nitrogen oxides to carbon dioxide, water vapor, and nitrogen gas. When the emissions control substrate 20 is configured as a particulate filter, such as a diesel particular filter, the wash coat 44 can include any metallic catalyst suitable to catalyze particulate filter regeneration. For example, the wash coat 44 can include a precious metal including at least one of the following: platinum; palladium; rhodium; cerium; iron; manganese; nickel; and copper.

The channels 30 are arranged such that at the first end (inlet end) 24 of the body 22 some of the channels 30 define openings 50, and are thus open to receive exhaust. Other ones of the channels 30 are closed at the first end 24 by first end (inlet end) plugs 52. The channels 30 that are open at the first end 24 are closed at the second end 26 by second end (outlet end) plugs 54. The channels 30 that are closed at the first end 24 by first end plugs 52 are open at the second end 26, and thus define openings 56 at the second end 26.

Exhaust flowing to the substrate 20 through the inlet 14 enters the body 22 through the openings 50 at the first end 24. Due to the second end plugs 54, exhaust entering through the openings 50 is forced through the sidewalls 40 into adjacent channels 30 that define openings 56 at the second end 26. The exhaust is treated as it flows through the sidewalls 40 and through the wash coats 44. When the substrate 20 is configured as a particulate filter, particulate matter is filtered from the exhaust as the exhaust flows through the sidewalls 40. For example, when the substrate 20 is configured as a diesel particulate matter filter, the sidewalls 40 can be made of any material that is suitable to filter (and thus trap therein) particulate matter. The particulate matter filter can be configured to filter any atmospheric pollutant including hydrocarbons or other chemicals, such as soot, ash, dust, fumes, smog, etc.

The wash coat 44 can be any catalyst suitable for regenerating the substrate 20 by reducing the ignition temperature necessary to oxidize particulate matter that has accumulated on or in the sidewalls 40. Exemplary catalysts include, but are not limited to, platinum, palladium, rhodium, cerium, iron, manganese, nickel, and copper. When the substrate 20 is configured as a catalytic converter, the flow of exhaust from one channel 30 to another channel 30 facilitates interaction of exhaust with the wash coat 44 to allow the catalyst of the wash coat 44 to catalyze a redox reaction to treat toxic pollutants in the exhaust gas prior to release of the exhaust into the atmosphere. For example, the catalyst will convert carbon monoxide, hydrocarbon, and nitrogen oxides to carbon dioxide, water vapor, and nitrogen gas, for example.

Figure 4:
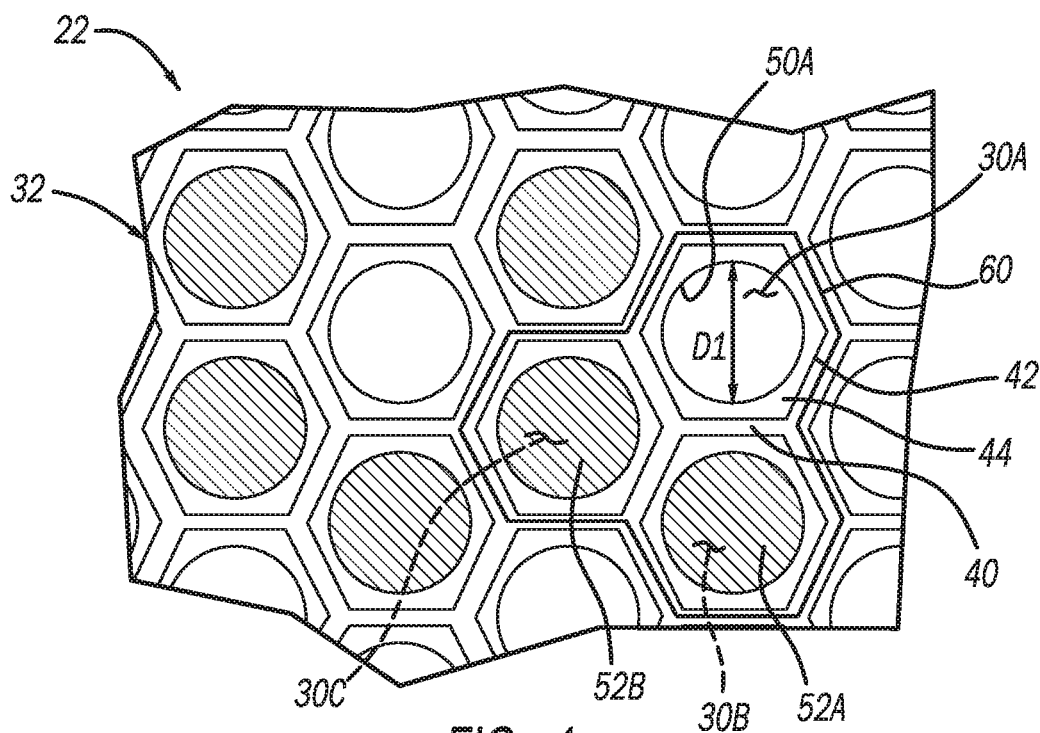
FIG. 4 illustrates area 4 of FIG. 2.

FIG. 4 illustrates arrangement of the channels 30 at the inner region 32 of the body 22. The diameter of the channels 30 at the inner region 32 is generally uniform, and is illustrated in FIG. 4 at D1. The channels 30 are arranged such that for any group of three adjacent channels 30, one of the adjacent channels 30 will be open at the first end 24 (and thus define opening 50 at the first end 24), and two of the adjacent channels 30 will be closed at the first end 24, such as by first end plugs 52. For example and with respect to inner group 60 of three adjacent channels 30A, 30B, and 30C, channel 30A is open at the first end 24 to define opening 50A, and channels 30B and 30C are closed by first end plugs 52A and 52B.

Figure 5:
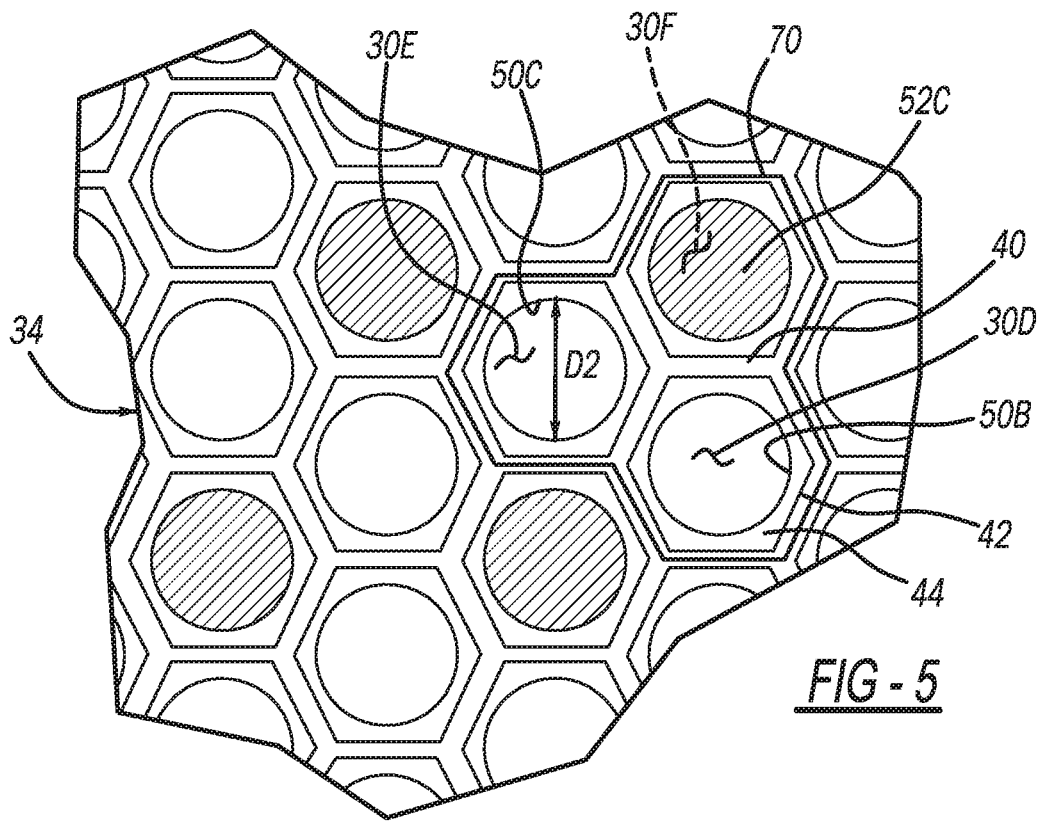
FIG. 5 illustrates area 5 of FIG. 2.

FIG. 5 illustrates arrangement of the channels 30 at the outer region 34 of the body 22. At the outer region 34, the channels 30 are arranged such that for each group of three adjacent channels 30, two of the channels 30 are open at the first end 24 (and thus define openings 50), and one of the channels 30 is closed at the first end 24, such as by first end plug 52. Specifically and with respect to outer group 70 of three adjacent channels 30D, 30E, 30F, channels 30D and 30E are open at the first end 24 to define openings 50B and 50C, and channel 30F is closed at the first end 24 by first end plug 52C. The diameter of the channels 30 at the outer region 34 is generally uniform, and illustrated in FIG. 5 at D2. The diameters D1 of the channels 30 at the inner region 32 are the same as, or generally the same as, the diameters D2 of the channels 30 at the outer region 34.

Figure 6:
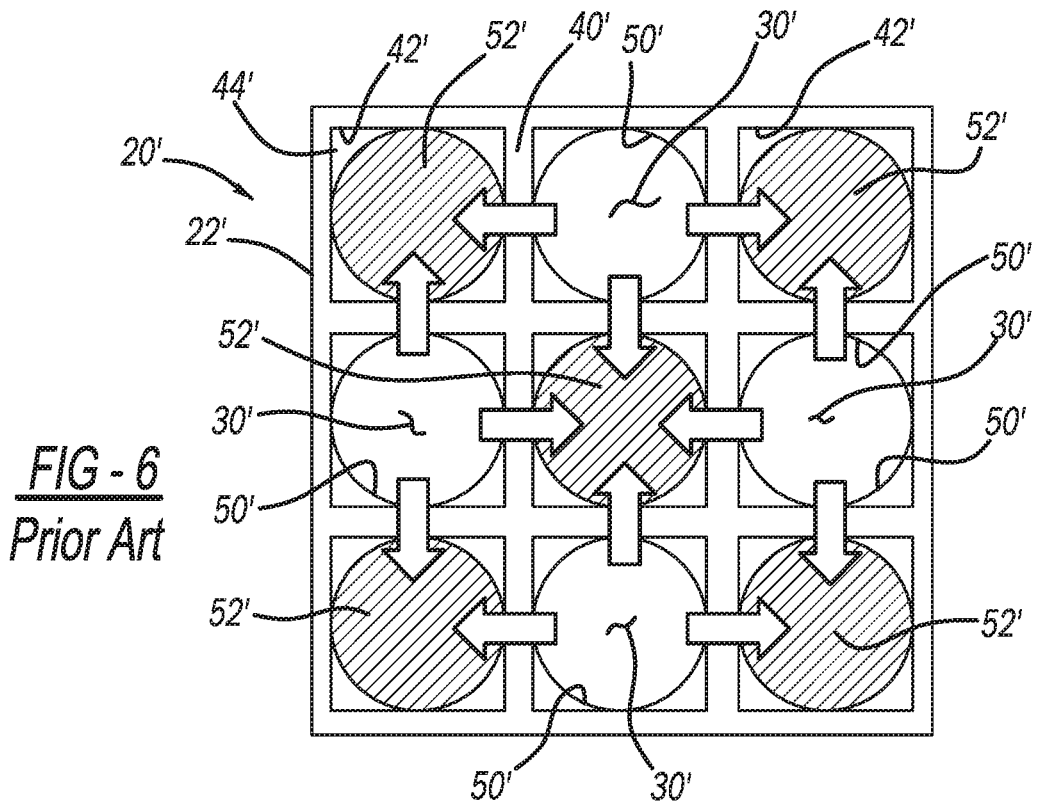
FIG. 6 illustrates channels of a prior art emissions control substrate.

The present disclosure provides numerous advantages over the art, such as the prior art emissions control substrate body 22' illustrated in FIG. 6. In the prior art arrangement of FIG. 6, sidewalls 40' are arranged to define a plurality of square cells 42', which is in contrast to the hexagonal cells 42 of the present disclosure. As a result of the cells 42' being square, some areas of the wash coat 44' are thinner than others. Because the wash coat 44' provides resistance to exhaust flow, the exhaust will always flow through the areas of the wash coat 44' that are the most thin (or areas where no wash coat 44' is present) because such areas provide the least resistance. Such areas of the wash coat 44' that provide the least resistance are illustrated in FIG. 6 by the arrows extending through the sidewalls 40'. Thus with the prior art arrangement of FIG. 6, less exhaust flows through the wash coat 44' as compared to the wash coat 44 of the present disclosure because the wash coat 44 is present uniformly about the hexagonal sidewalls 40. The hexagonal shape of the sidewalls 40 advantageously facilitates uniform application of the wash coat 44 about the sidewalls 40. Thus the present disclosure makes more efficient use of the wash coat 44, thereby improving the overall efficiency and effectiveness of the emissions control substrate 20.

The present disclosure also advantageously spreads exhaust flow across the first end 24 of the body 22 in order to more efficiently treat exhaust gas. Specifically, at the inner region 32, a greater proportion of the channels 30 are plugged with the first end plugs 52 as compared to at the outer region 34. Specifically and as illustrated in FIG. 4, at the inner region 32 two out of every three adjacent channels 30 are plugged with first end plugs 52, and one out of every three adjacent channels 30 defines an opening 50. Thus the amount of exhaust that can enter the body 22 at the inner region 32 is limited to only those channels 30 defining openings 50. As a result, exhaust is forced outward to the outer region 34. At the outer region 34, for every three adjacent channels 30, only one of the channels 30 is plugged with a first end plug 52, and two of the channels 30 define openings 50. Thus the exhaust forced outward from the inner region 32 can be received by the channels 30 at the outer region 34. By spreading the exhaust about the first end 24, the overall length of the body 22 can be reduced because the channels 30 are used more effectively, the amount of back pressure can be reduced, and there will be less engine power lost as compared to existing emissions control substrates (such as prior art substrate 20' of FIG. 6).

Furthermore, the channels 30 of the present disclosure are arranged at the first end 24 such that no channel plugged with plug 52 is surrounded by other channels plugged with plug 52, which would undesirably provide a "dead" channel to which little or no exhaust from a neighboring channel would flow to. By making use of every channel 30, the present teachings advantageously improve the overall efficiency of the substrate 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An emissions control substrate for treating exhaust from an engine, the emissions control substrate comprising:
   a plurality of hexagonal cells extending between a first end and a second end of the emissions control substrate; and
   wash coats at interiors of the plurality of hexagonal cells;
   wherein:
      at an inner region of the emissions control substrate through which a longitudinal axis of the emissions control substrate extends, for every group of three adjacent hexagonal cells of the plurality of hexagonal cells: two are plugged at the first end and open at the second end, and one is open at the first end and plugged at the second end;
      at an outer region of the emissions control substrate surrounding the inner region, for every group of three adjacent hexagonal cells of the plurality of hexagonal cells: one is plugged at the first end and open at the second end, and two are open at the first end and plugged at the second end; and
      each one of the hexagonal cells plugged at the first end is adjacent to at least one of the hexagonal cells that is not plugged at the first end.

2. The emissions control substrate of claim 1, wherein the emissions control substrate is a catalytic converter.

3. The emissions control substrate of claim 1, wherein the emissions control substrate is a particulate filter.

4. The emissions control substrate of claim 3, wherein the particulate filter is a diesel particulate filter.

5. The emissions control substrate of claim 1, wherein the plurality of hexagonal cells are defined by a body of the emissions control substrate, the body includes a porous ceramic material.

6. The emissions control substrate of claim 1, wherein the wash coats include a metallic catalyst configured to catalyze at least one of: particulate filter regeneration; and conversion of carbon monoxide, hydrocarbons, and nitrogen oxides to carbon dioxide, water vapor, and nitrogen gas.

7. The emissions control substrate of claim 1, wherein a first diameter of each one of the plurality of hexagonal cells at the inner region is the same as a second diameter of each one of the plurality of hexagonal cells at the outer region.

8. An emissions control substrate for treating exhaust from an engine, the emissions control substrate comprising:
   a first end and a second end opposite the first end;
   a plurality of sidewalls defining a plurality of hexagonal cells extending between the first end and the second end;
   wash coats at interiors of the plurality of hexagonal cells; and
   a plurality of channels defined by the wash coats at the interiors of the plurality of hexagonal cells;
   wherein:
      at an inner region of the emissions control substrate through which a longitudinal axis of the emissions control substrate extends, for every group of three adjacent hexagonal cells of the plurality of hexagonal cells: two are plugged at the first end and open at the second end, and one is open at the first end and plugged at the second end; and
      at an outer region of the emissions control substrate surrounding the inner region, for every group of three adjacent hexagonal cells of the plurality of hexagonal cells: one is plugged at the first end and open at the second end, and two are open at the first end and plugged at the second end.

9. The emissions control substrate of claim 8, wherein the emissions control substrate is a catalytic converter.

10. The emissions control substrate of claim 8, wherein the emissions control substrate is a particulate filter.

11. The emissions control substrate of claim 10, wherein the particulate filter is a diesel particulate filter.

12. The emissions control substrate of claim 8, wherein the plurality of sidewalls are defined by a body of the emissions control substrate, the body made of a porous material.

13. The emissions control substrate of claim 12, wherein the porous material includes a ceramic material.

14. The emissions control substrate of claim 13, wherein the ceramic material includes cordierite.

15. The emissions control substrate of claim 8, wherein the wash coat includes a metal.

16. The emissions control substrate of claim 15, wherein the metal is a metallic catalyst configured to catalyze at least one of: particulate filter regeneration; and conversion of carbon monoxide, hydrocarbons, and nitrogen oxides to carbon dioxide, water vapor, and nitrogen gas.

17. The emissions control substrate of claim 16, wherein the metallic catalyst includes a precious metal including at least one of the following: platinum; palladium; rhodium; cerium; iron; manganese; nickel; and copper.

18. The emissions control substrate of claim 8, wherein a first diameter of each one of the plurality of hexagonal cells at the inner region is the same as a second diameter of each one of the plurality of hexagonal cells at the outer region.

19. The emissions control substrate of claim 8, wherein the plurality of hexagonal cells extend linearly between the first end and the second end, parallel to the longitudinal axis of the emissions control substrate.

20. The emissions control substrate of claim 8, wherein each one of the hexagonal cells plugged at the first end is adjacent to at least one of the hexagonal cells that is not plugged at the first end.

* * * * *